June 20, 1950 W. F. SPANG 2,512,290
FOWL CLEANING TOOL
Filed Oct. 16, 1946
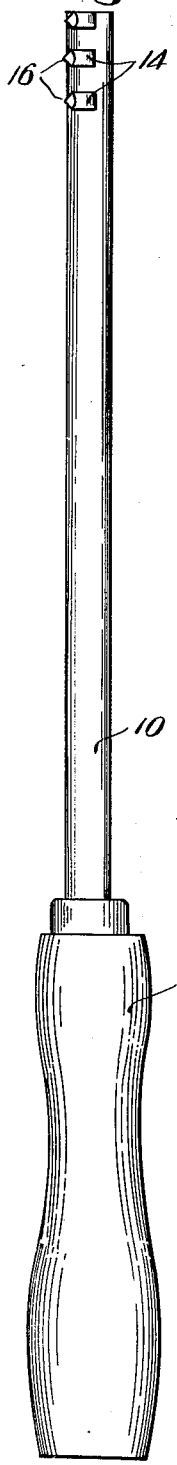
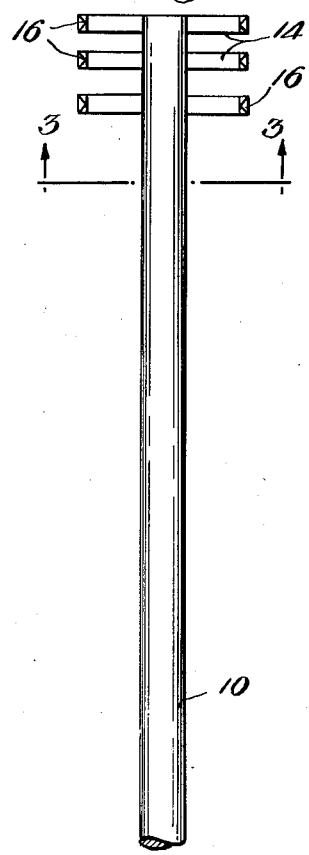
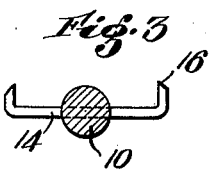
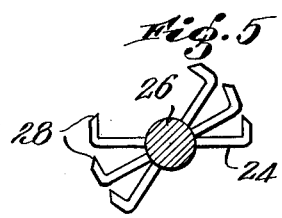
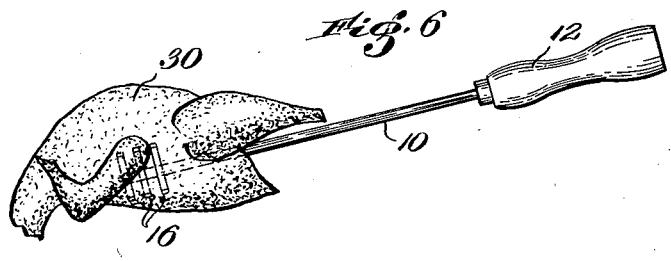
Inventor:
William F. Spang,
by Kenway & Witter
his Attys.

Patented June 20, 1950

2,512,290

UNITED STATES PATENT OFFICE 2,512,290

FOWL CLEANING TOOL

William F. Spang, Milton, Mass., assignor to Cube Steak Machine Co., Boston, Mass., a partnership Application October 16, 1946, Serial No. 703,653

1 Claim. (Cl. 17—11)

This invention relates to a fowl cleaning tool for manual use in removing the lungs and like internal organs from fowls. When the entrails are removed from a fowl, as by the eviscerating machine disclosed in Patent 2,327,224, the lungs and like internal organs remain attached to the cavity wall. Removal of these organs by the hand of the cleaner is difficult due to the small size of the cavity and the restricted opening thereinto. The primary object of my invention resides in the production of a simple hand tool for conveniently performing this operation.

The cleaning tool comprising the invention embodies a shaft provided with a handle on one end and a plurality of cleaning elements at its other end. The cleaning elements extend outwardly from and along the shaft in adjacent and spaced relation and are provided with claw-like ends so disposed that they can be placed against and remove the lungs merely by rotating the shaft. The instrument not only provides for such removal but its use permits the operator to have a clear and unobstructed view of the interior of the cavity being cleaned. The provision of such an improved tool adapted conveniently and efficiently to perform the stated function comprises a further object of the invention.

These and other features of the invention will be more readily understood and appreciated from the following detailed description of preferred embodiments thereof selected for purposes of illustration and shown in the accompanying drawing, in whch, Fig. 1 is a side elevation of my fowl cleaning tool, Fig. 2 is a fragmentary like view rotated 90°, Fig. 3 is a sectional view taken on line 3—3 of Fig. 2, Fig. 4 is a like view of a modified construction, Fig. 5 illustrates a further modification, and Fig. 6 is a side elevation illustrating the use of the tool.

Referring first to Figs. 1-3 of the drawing, 10 indicates the shank or shaft of the tool provided with a handle 12 at its rear end. The other and forward end of the shaft is provided with claw-like cleaning elements 14 for engaging and removing lungs or the like from fowls upon rotation of the shaft.

The shaft 10 is preferably a metal rod of rigid construction to resist torsional stress and the cleaning elements 14 are preferably in the form of a plurality of metal straps each having an intermediate portion extending through and secured in the forward end of the rod. The straps extend outwardly at opposite sides of the rod and the ends are turned up and pointed to provide piercing claws 16. The claws at both sides of the rod extend in the same direction so that upon rotation of the rod one set of claws functions forwardly whereas the set at the opposite side is free to move rearwardly. The claws of each set are substantially in alignment longitudinally of the shaft 10 whereby they function simultaneously in use. The shape of the elements is not of particular importance so long as the claws are arranged to perform the desired function. In Fig. 4, for example, I have illustrated elements 18 of a different shape mounted on a rod 20 and having piercing claws 22 in alignment as the claws 16 illustrated in Figs. 1–3.

While the piercing claws are preferably arranged as illustrated in Figs. 1–4, it will be understood that such arrangement is not essential in the tool. For example, in Fig. 5 I have illustrated the elements 24 as arranged in spaced but non-parallel relation along the shaft 26, the claw ends 28 all pointing in the same general direction transversely of the shaft and elements.

The use of the tool is illustrated in Fig. 6. The operator merely places the forward end of the tool in the cavity of the fowl 30 with the claws 16 in contact with the organ to be removed. Rotation of the tool in the forward direction of the claws thereupon functions to pierce the organ and remove it from the cavity wall. It will be apparent that the tool permits the operator a clear vision into the cavity without obstruction such as when removing the organ by hand.

Having thus disclosed my invention what I claim as new and desire to secure by Letters Patent is:

A fowl cleaning tool comprising a rigid rod of substantial length, a plurality of U-shaped flat metal straps carried in spaced relation on one end of the rod, each strap having two sharp extremities pointing in the same general direction at opposite sides of the rod and the mid portions of the straps extending transversely through and secured rigidly to the rod with said extremities all pointing in the same general direction transversely of the rod, and a handle on the other end of the rod, said one end of the rod being adapted to be inserted into a fowl and said sharp extremities at one side of the rod being adapted to pierce and remove the internal organs from the fowl when brought into contact therewith and the rod rotated in one direction and the sharp extremities at the other side of the rod being adapted likewise to pierce and remove the internal organs when the rod is rotated in the other direction.

WILLIAM F. SPANG.

REFERENCES CITED

The following references are of record in the file of this patent:

UNITED STATES PATENTS

| Number | Name | Date |
| --- | --- | --- |
| D. 140,193 | Lynn | Jan. 30, 1945 |
| 504,777 | Fischer | Sept. 12, 1893 |
| 1,421,397 | Bruck | July 4, 1922 |